United States Patent [19]

Bornstein et al.

[11] Patent Number: 4,867,544

[45] Date of Patent: Sep. 19, 1989

[54] OPTICAL GLASS ELEMENTS HAVING A GRADED REFRACTION INDEX FOR IR LIGHT AND METHOD FOR THEIR PRODUCTION

[75] Inventors: Aharon Bornstein, Holon; Tsadok Tsalach, Kibbutz Shoval, both of Israel

[73] Assignee: The State of Israel, Atomic Energy Commission, Soreq Nuclear Research Center, Israel

[21] Appl. No.: 231,197

[22] Filed: Aug. 11, 1988

[30] Foreign Application Priority Data

Jun. 6, 1988 [IL] Israel ............................. 86636

[51] Int. Cl.⁴ ................................. G02B 1/00
[52] U.S. Cl. ........................ 350/413; 350/1.4
[58] Field of Search ................... 350/413, 1.4

[56] References Cited

U.S. PATENT DOCUMENTS 4,371,232  2/1983  Jensen et al. ................... 350/413

Primary Examiner—Bruce Y. Arnold
Assistant Examiner—Rebecca D. Gass
Attorney, Agent, or Firm—Steinberg & Raskin

[57] ABSTRACT

Optical glass elements with graded refraction index in the infra red region. The elements are made of doped oxygen free chalcogenide glass. The concentration of the dopant decreases from the periphery inward. Typical examples of dopants are As, S and Se.

The glass elements are prepared by exposing an oxygen free chalcogenide glass to a molten chemical element or salt at about 150°–400° C. in an oxygen free atmosphere.

6 Claims, 1 Drawing Sheet

OPTICAL GLASS ELEMENTS HAVING A GRADED REFRACTION INDEX FOR IR LIGHT AND METHOD FOR THEIR PRODUCTION

FIELD OF THE INVENTION

The present invention concerns optical glass elements having graded index of refraction (GRIN) in the infrared region.

BACKGROUND OF THE INVENTION AND PRIOR ART

Systems used for thermal-imaging or focusing laser energy and other infrared sources, normally comprise a set of several lenses. The reason for this is that it is extremely difficult and often impossible to obtain an image or a clear focus using a single lens, due to spherical and chromatic optical distortions. In order to compensate for the distortions, entire sets of lenses, or alternatively aspherical lenses are being used. The latter have the drawback that their polishing is complicated and expensive. The increase of the number of components in the optical path of the image increases the weight and price of the system, reduces its reliability and, especially, causes loss of transmission. For example, transmission by each germanium lens is about 50%.

The use of sets of lenses for transmittance of a clear image is common practice also in the visible region. For example, any camera "lens" comprises a set of about 5 to 10 different lenses to facilitate correction of aberrations. In the IR region the traditional solution to correct optical distortions by using sets of lenses is more problematic, since the materials transparent in the IR region have high refraction indices and densities and are most expensive. The use of single optical elements instead of a set of conventional lenses increases the reliability of the system and reduces the cost thereof.

Imaging by conventional lenses is induced by a discrete refraction occurring at the boundaries of a homogeneous medium and depending on the refraction index, thicknesses and surface curvatures. The technique of graded-index optics, which is characterized by using lenses with continuously graded refraction index (GRIN) each having simpler and less costly surface shape, can do with fewer elements than an assembly of a plurality of lenses each having a uniform refraction index. Lens elements with GRIN are able to focus light without curved surfaces. This ability results from the fundamentally different way light behaves as it travels through a transparent material with GRIN as opposed to material with a uniform refraction index. Whereas in the latter light is refracted only at the surface of the lens, a lens element with GRIN bends light continuously as it travels across the lens, causing the rays to progress along a curved path.

Combining surface refraction with continuous refraction provides a number of advantages over conventional lens systems, such as correction of aberration without complex multi-element systems or aspheric elements, simplification of the geometry of the lenses and formation of real images at the lens surface.

Several methods are known for the preparation of GRIN elements for the visible region.

By one known method, glass is bombarded with neutrons to create a change in the refraction index. The major disadvantages of such technique are the large number of neutrons necessary to bring about a change of the refraction index and the possibility that the changes are reversible so that the resulting gradient is not permanent.

Another known method involves chemical vapour deposition (CVD). This technique has been widely employed in the manufacture of graded index optical fibres for use in telecommunication. Essentially, the process comprises successively depositing by CVD techniques vitreous layers of different compositions on either the inside or the outside of a silica tube. Each deposited layer has a different refraction index and in this way a radially graded refraction index is achieved. This technique has severe limitations for large-geometry lenses.

Yet another known technique is the so-called ion stuffing method which comprises heating special glass until it phase-separates. One of the phases is selectively dissolved out of the glass by means of an acid which leaves behind a sponge-like glass matrix which is immersed in a bath containing ions or molecules. The ions or molecules in the bath diffuse into the glass matrix and before saturation, the diffusion is discontinued whereby a concentration gradient is formed. In a final step, the glass is heated so as to bring about a collapse of the spongy structure which results in the formation of a lens element with a graded refraction index. This technique is cumbersome and difficult to monitor and only limited types of profiles can be produced thereby.

A still further known technique for making GRIN lens elements is based on crystal growing and this method has been shown to work with sodium chloride and silver chloride combinations. Starting with a sodium chloride seed, the crystal is pulled. With time, more sodium chloride is pulled out of the bath whereby the silver chloride concentration in the bath is increased and in this way the composition of the growing crystal and accordingly its refractive index varies gradually. It has also been suggested to grow by this technique silicon-germanium crystals with a graded refraction index for IR transmission but this proposal has not led to any commercial product.

The probably most widely used known method for the production of GRIN lens elements is the diffusion method which is the simplest in terms of instrumentation and control. By this method the glass is immersed into a bath of a molten salt, and ions such as lithium diffuse into the glass and exchange other ions therein. In the course of diffusion, a concentration gradient of the diffusing ions is formed with the concentration of the ions decreasing from the bath-glass interface into the glass and this in turn gives rise to a graded refraction index. In order to increase the refraction index, glass ions are exchanged for other ions having larger radii, i.e. ions having a greater degree of polarization for incident light. Several factors influence the rate of ion exchange, such as the electrochemical affinities between opposing ions, the bonding strength that retains the glass ions in the lattice site and relative mobilities of the various ionic species inside the glass network.

The ion mobility depends on the temperature. A high temperature can be thought of as supplying additional vibrational energy to the glass lattice and expanding the channels through which the ions are free to move. Although the temperature plays a dominant role, the glass composition is important in determining which ions can be exchanged and what physical condition the glass will be in at the end of the process.

By the above known techniques, three types of GRIN lens elements can be obtained:

(i) GRIN elements with an axial gradient - in this type of GRIN elements the index of refraction varies along the optical axis and the surfaces of constant refraction index are outer planes perpendicular to the symmetry axis. Such axial gradient GRIN lenses are particularly useful for replacing aspheric surfaces. In fact, it has been shown theoretically that there exists a 1 to 1 correlation between an axial gradient and an aspheric surface (D. T. Moore, J. Opt. Soc. Am. 68 (9) 1157–1166 (1978) and Phys. Teach. 15 (7), 409–413 (1977). Accordingly, this technique makes it possible to replace prior art aspheric surface lenses with spherical GRIN lenses having an axial gradient.

(ii) GRIN elements with a radial or cylindrical gradient - in this type of GRIN elements the refractive index varies from the symmetry axis outward and the surfaces of constant index are cylinders whose axis corresponds to the optical axis of the lens. Two notable examples of such GRIN elements are graded index optical fibres in which the length of the fibre is much greater than the diameter (J.G. Beale, Phys. Chem. Glasses 212 (1) 5–21 (1980) and the Wood lens first made in 1905 (Robert W. Wood, Physical Optics [1934, McMillan New York]).

(iii) GRIN elements with spherically graded refraction index - in this type of GRIN elements the refractive index gradient is centrosymmetrical so that the surface of constant indices are spheres. Where the gradient centre of symmetry coincides with the centre of curvature, there are obtained the so-called Maxwell Fisheye lenses (first developed in 1854) and the Luneburg lenses used in the microwave region of the spectrum and for acoustical imaging. No optical applications of this type of GRIN lenses have ever been developed.

None of the above described techniques for the manufacture of GRIN lens elements is useful for imaging in the infrared region. It is therefore the object of the present invention to provide a method for making GRIN lens elements for imaging in the infrared region of the optical spectrum and therefore to fulfill a long-felt need.

SUMMARY OF THE INVENTION

In accordance with the present invention, it has surprisingly been found that an optical GRIN glass element suitable for infrared imaging or focusing is obtainable by doping an oxygen free chalcogenide glass, i.e. a glass containing at least one of the chalcogenide elements S, Se and Te together with at least one element of the group of Al, Ga, Ti, Si, Ge, P, As, Sb, Bi, Br and I. Such chalcogenide glasses will be referred to hereinafter as "chalcogenide glass of the kind specified".

The invention consists in an optical glass element having a graded refractive index in the infra-red region comprising an oxygen-free matrix of a chalcogenide glass of the kind specified doped with at least one suitable doping element whose concentration decreases gradually from at least one face of the periphery inward.

The term "suitable doping element" used herein refers to any element or ion that is capable of causing a change of the refraction index, has an adequate mobility and does not adversely affect the optical and mechanical properties of the chalcogenide glass of the kind specified that are required for IR elements. For a given chalcogenide glass of the kind specified suitable doping elements can be selected on theoretical considerations and any such selection can be readily verified by simple and routine experimentation. Typical examples of doping elements are Ag, S and Se.

The invention further provides a method of making an optical glass element having a graded refractive index in the infra-red region, comprising exposing an oxygen-free body of a chalcogenide glass of the kind specified to a molten chemical element or salt at a temperature of about 150° to about 400° C. in an oxygen-free atmosphere until a desired intrusion depth is obtained and thereafter withdrawing the doped product.

Depending on the nature of the chalcogenide glass matrix and the dopant as well as on the desired intrusion depth of the dopant, the exposure time may range between several hours to several months.

Where it is desired to obtain an axial gradient, the melt containing the doping element has to be contacted with a terminal surface of the matrix, e.g. the end surface of a rod to bring about axial diffusion. Where, on the other hand, it is desired to produce a radial or spherical gradient, a suitably shaped matrix body is immersed into the dopant containing melt whereby the diffusion is radial or spherical. In case of radial diffusion, it may be desirable to protect the end surface so as to avoid any axial diffusion or, alternatively, it is possible at the end of the operation to cut away small end portions from the product.

In the course of the diffusion of the dopant into the matrix, some of the constituent elements of the chalcogenide glass of the kind specified are replaced so that within the intrusion area the original composition is modified.

DESCRIPTION OF THE DRAWINGS

For better understanding, the invention will hereinafter be described with reference to the enclosed drawings in which.

DESCRIPTION OF PREFERRED EMBODIMENTS

Figure 1:
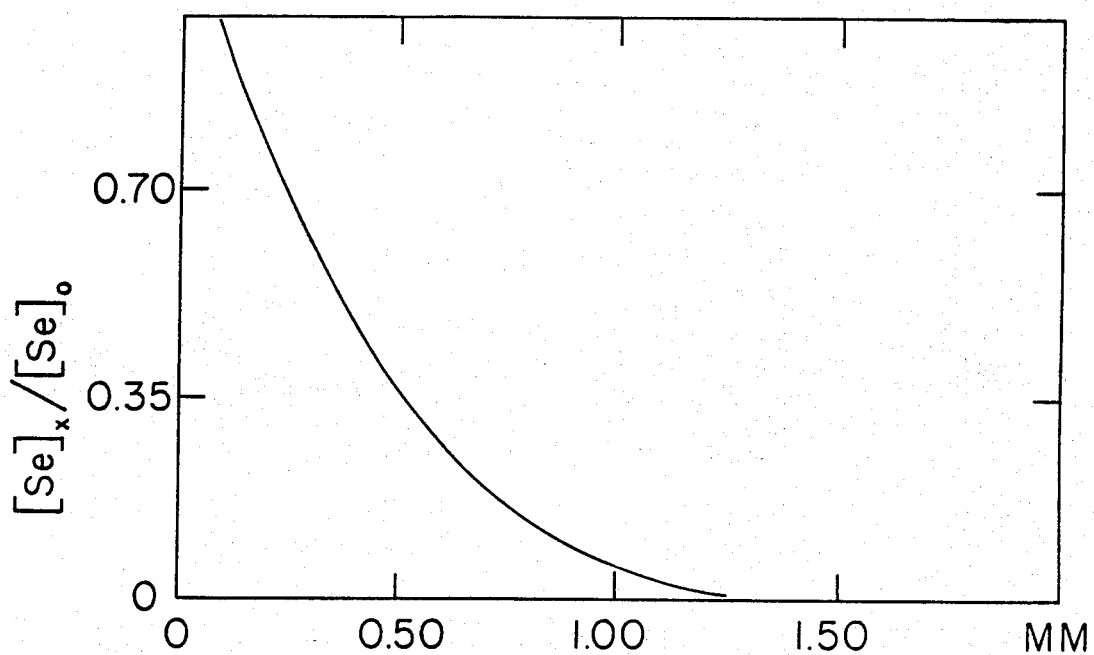
FIG. 1 shows an axial diffusion profile of Se into an $As_2Se_3$ matrix at a temperature of 250° C. after 4 days.

During the diffusion of Se atoms into an $As_2Se_3$ matrix, Se atoms from the melt replace As atoms in the glass. Attention is now directed to FIG. 1 in which the marking "+" stands for an experimental profile and the marking "*" stands for the theoretical profile. In FIG. 1 the ration $[Se]_x/[Se]_o$ between the concentration of Se at a certain depth x and at the surface (x=0), is plotted against the intrusion depth. It is seen from FIG. 1 that under the specified experimental conditions the experimental Se profile coincides with the theoretical one and this profile accounts for an axially graded refraction index in the infrared region.

Figure 2:
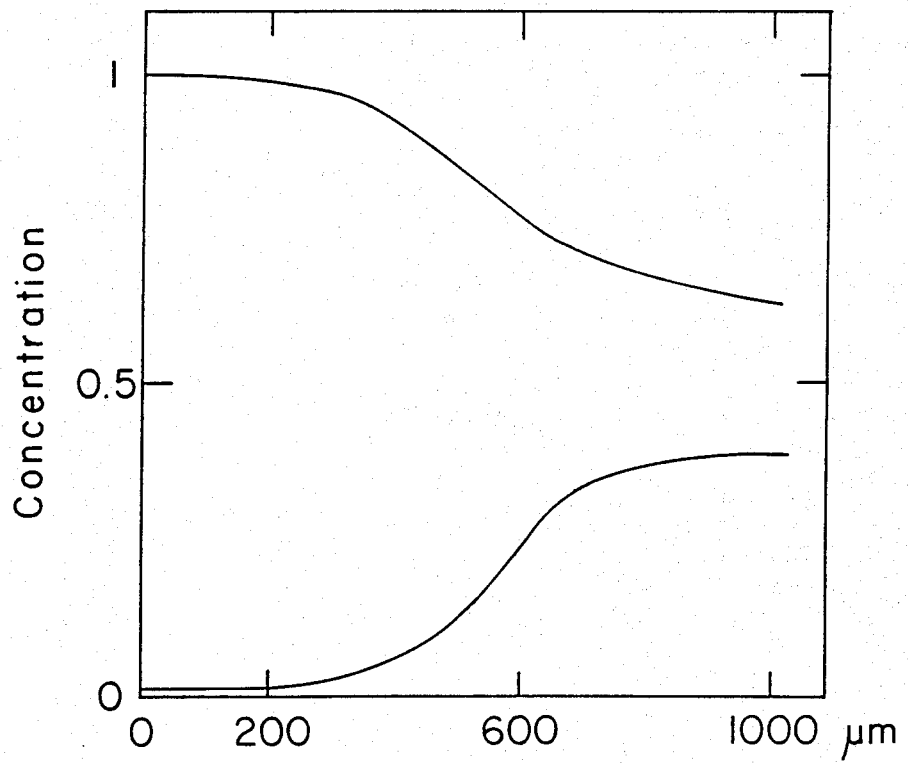
FIG. 2 shows a radial diffusion profile of Se into an $As_2Se_3$ matrix at 177° C. for 62 days.

Reference is now made to FIG. 2 which describes a radial diffusion profile in a 10mm diameter $As_2Se_3$ rod after immersion in a molten Se bath at a temperature of 177° C. for 62 days. The upper Se curve describes the variation of the $[Se]_x/[Se]_o$ ratio and likewise the lower As curve describes the $[As]_x/[As]_o$ ratio, $[Se]_x$ and $[As]_x$ standing for the concentration of these elements at an intrusion depth x while $[Se]_o$ and $[As]_o$ stand for the concentrations at the surface, i.e. intrusion depth 0.

The following examples describe the preparation of two species of lens element having a graded index-refraction in the infrared region in accordance with the present invention, it being understood that the invention is not limited thereto.

EXAMPLE 1

Preparation of an $As_2Se_3$ Glass $As_2Se_3$ glasses were prepared from highly pure (99.9999%) commercial Arsenic and Selenium. The elements were weighed and loaded into a clean silica glass ampoule in an inert atmosphere glove box. The loaded ampoule was evacuated for several hours before sealing. The glasses were melted for 5 hours at 900° C. in a rocking furnace, removed from the furnace and cooled in air. The resulting glass was purified by known methods until virtually oxygen free.

EXAMPLE 2

Axial diffusion 1 gram of selenium was placed on the top of a rod of an oxygen free $As_2Se_3$ glass prepared in accordance with Example 1 (diameter 10mm, length 30mm), inside a vacuum sealed silica tube ($10^{-7}$ torr). The ampoule was introduced in a furnace at 350° C. for a few minutes to get good interface between the glass and the melt. The diffusion was carried out in a furnace at 245° C. The diffusion depth achieved after 62 days was 3.85mm.

EXAMPLE 3

Radial diffusion

A rod of an $As_2Se_3$ glass prepared as in Example 1 and having a 15mm diameter, was placed in a silica tube. The chalcogenide glass was covered selenium then the tube was vacuum-sealed and introduced in a furnace for a few minutes to melt the selenium on the glass and ensure good interface between them. The experiment was carried out at diffusion temperature of for 62 days at 180° C. and of 245° C. for 95 hours. Samples were cut from the centre of the glass for measurements. The radial concentration distribution of As and Se was measured by SEM EDAX, and the results are given in the following Tables 1 and 2, which show the ratios of Se and As concentrations as function of the radial distances in mm from the surface of the rod. In these Tables $C_{oSe}$ and $C_{oAs}$ mean the respective concentrations of Se and As at diffusion distance 0 (the rod surface) and $C_{Se}$ and $C_{As}$ mean the concentrations of these elements and at diffusion distance in mm.

TABLE 1

| Diffusion at 245° C. for 95 Hours | | |
|---|---|---|
| x in mm | $C_{Se}/C_{oSe}$ | $C_{As}/C_{oAs}$ |
| 0.4 | 0.484 | 0.516 |
| 0.6 | 0.269 | 0.713 |

TABLE 1-continued

| Diffusion at 245° C. for 95 Hours | | |
|---|---|---|
| x in mm | $C_{Se}/C_{oSe}$ | $C_{As}/C_{oAs}$ |
| 0.8 | 0.123 | 0.877 |
| 1.0 | 0.054 | 0.946 |

The radial refraction index gradient $\Delta n$ was measured by IR interferometry and the results are given in the following Table 3 which shows the variation $\Delta n$ of the refraction index as a function of the radial distance x in mm from the surface.

TABLE 3

| Diffusion at 180° C. for 62 Days | |
|---|---|
| x in mm | $\Delta n \cdot 10^{-5}$ |
| 0.780 | 175 |
| 0.830 | 149 |
| 0.870 | 125 |
| 0.910 | 99 |
| 0.980 | 75 |
| 1.040 | 49 |
| 1.180 | 25 |

We claim:

1. An optical glass element having a graded refraction index in the infrared region, consisting essentially of an oxygen-free matrix of a chalcogenide optical glass formed of at least one chalcogenide element selected from the group consisting of S, Se and Te, together with at least one element selected from the group consisting of Al, Ga, Ti, Si, Ge, P, As, Sb, Bi, Br and I doped with at least one suitable doping element whose concentration decreases gradually from at least one face of the periphery inward.

2. Optical glass element according to claim 1 wherein said doping element is selected from the group consisting of Ag, S and Se.

3. Optical glass element according to claim 1 wherein said doping element is Se.

4. A method of making an optical lens element having a graded refraction index in the infrared region, which comprises exposing an oxygen free matrix of a chalcogenide optical glass formed of at least one chalcogenide element selected from the group consisting of S, Se and Te, together with at least one element selected from the group consisting of Al, Ga, Ti, Si, Ge, P, As, Sb, Bi, Br and I to a molten chemical doping element or salt thereof at a temperature of about 150° to about 400° C. in an oxygen-free atmosphere until a desired intrusion depth is obtained and thereafter withdrawing the doped product.

5. The method of claim 4 wherein the doping element is Se.

6. Method according to claim 4 wherein said doping element is selected from the group consisting of Ag, S and Se.

* * * * *